United States Patent Office 2,806,934
Patented Sept. 17, 1957

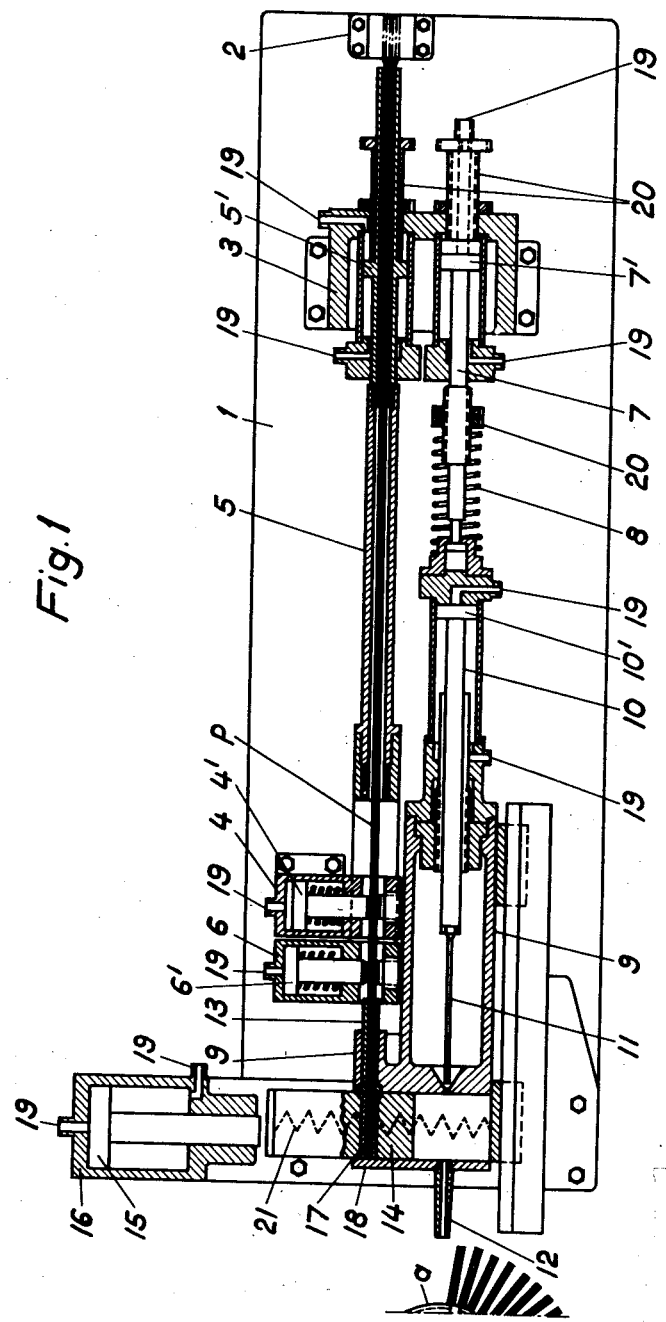

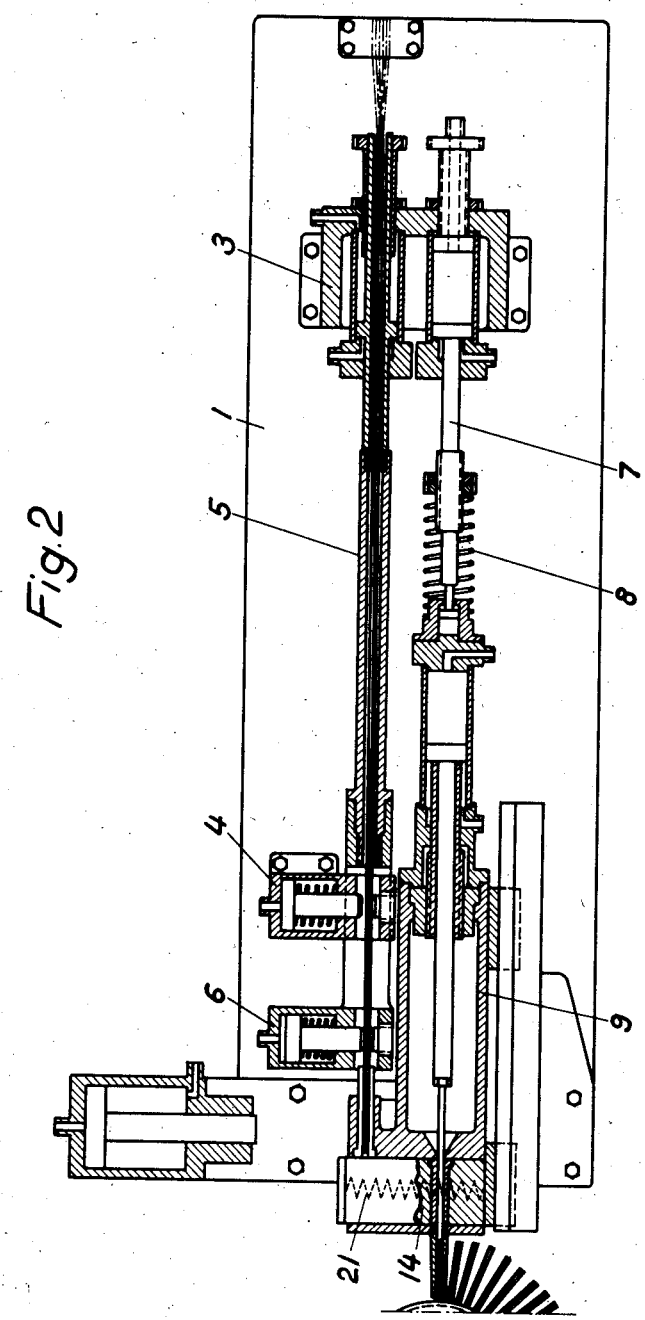

2,806,934

APPARATUS FOR ELECTRIC BUTT WELDING OF STUDS AND THE LIKE

Bror Andersson, Stockholm, and Nils Wallenborn, Johanneshov, Sweden, assignors to Allmanna Svenska Elektriska Aktiebolaget, Vasteras, Sweden, a corporation of Sweden Application May 10, 1955, Serial No. 507,372

Claims priority, application Sweden May 15, 1954

7 Claims. (Cl. 219—103)

This invention relates to a method and apparatus for welding studs or bolts to a plane or curved surface, in which such studs or bolts are produced by cutting the desired lengths from a strip of wire material.

Apparatus of this type are described in United States Patent No. 2,685,017, dated July 27, 1954, and in such known arrangements it is difficult to effect with one and the same apparatus the proper advance and cutting of the material with satisfactory welding results, more particularly when simultaneous welding of a plurality of studs or bolts to the same surface is desired, and the cutting of the studs from the wire material has heretofore involved serious difficulties because of the rapid wear of the cutting tool, with the result that such tool had to be replaced or sharpened after a relatively small number of cutting operations.

One object of the present invention is to remove these difficulties and to greatly increase the productive capacity of the apparatus.

In accordance with the present invention, the operation includes a first step in which means are employed for straightening and advancing the wire material to a cutting member, a second step in which the cutting member severs the advanced material by shearing, a third step in which the cut stud is advanced through a nozzle-like member to the surface of the work-piece, and a fourth step in which the stud is welded to the workpiece, and a feature of the invention is that these steps are carried out in such a sequence that the wire material is advanced simultaneously with the advance to the work-piece of the stud cut from the wire material during the preceding operation.

Further objects and advantages of the invention will appear more fully from the following description, especially when taken in conjunction with the accompanying drawings which form a part thereof.

In the drawings:

Fig. 1 is a cross-sectional view showing the parts of the apparatus in position for the cutting of the wire material to form the stud, and Fig. 2 is a similar view but showing the parts after the cutting operation and with the stud in position for welding to the work-piece.

In the specific embodiment of the invention as shown in the drawings, the wire material $p$ is advanced through the machine from right to left and the studs cut therefrom are moved downwardly and are then advanced and are finally welded to the work-piece $a$.

The wire material $p$ is drawn through a suitable straightening device 2, which is secured to a plate or frame 1, and the straightened wire then passes through a device 3 also fixed to the plate 1. The device 3 serves as a support or guide for the wire material and has a tubular member 5 extending therefrom and connected to a piston 5' which slides within a tubular surface in the device 3. Also fixed on the plate 1 is a holding device 4 having a piston 4', the lower side of which is engaged by a spring while the upper surface thereof may be acted upon by fluid pressure. Secured to and movable with the tubular member 5 is a gripping device 6 which is provided with a piston 6' and may be substantially similar to the holding device 4, the device 4 being adapted to hold the wire $p$ (Fig. 1) and the device 6 being adapted to grip and advance the wire (Fig. 2).

The device 3 is also formed with a cylinder having therein a piston 7' connected to a piston rod 7, which latter is connected mechanically by means of a spring 8 with a sliding member 9 mounted on suitable guides on the plate 1 and accommodating a piston 10' connected to a piston rod 10 having an end extension 11 arranged in alignment with a nozzle 12 extending from the sliding member 9.

In the drawings, the connections for the fluid pressure for the operation of the apparatus are shown at 19, so that fluid pressure may be delivered in proper sequence to the pistons 5', 7', 4', 6' and 10' and to the piston 15 hereinafter referred to.

The sliding member 9 is also provided with a guide tube 13 arranged in exact alignment with the tubular member 5 and the wire material contained therein.

The wire cutting means comprises a slide 14 mounted in suitable guides in the sliding member 9 so as to move in a direction at right angles to the direction of movement of the member 9 and of the advancing movement of the wire.

When the slide 14 is in the position shown in Fig. 1, it is in vertical alignment with a piston 15 mounted in a cylinder 16 secured to the plate 1, and a bore 17 in the slide 14 is in horizontal alignment with the guide tube 13.

The nozzle 12 serves both as a guide for the stud and as one of the two conductors of the welding current. The means for supplying the current to the work-piece $a$ are not shown on the drawings and may be arranged in different ways, as, for example, as described and shown in the said Patent No. 2,685,017, in which an auxiliary electrode is mounted on the support.

The apparatus shown on the drawings operates as follows:

For the adjustment of the lengths of the studs cut from the wire material, adjustable stop means 20 are provided for the regulation of the longitudinal movement of the parts 5 and 7, and a similar adjusting means 20' is provided for the control of the compression of the spring 8 connecting the part 7 with the sliding member 9.

Referring particularly to Fig. 1, which shows the wire material in its advanced position, the wire is cut by the operation of the piston 15 which causes downward movement of the slide 14, which latter continues its movement until it reaches the level shown in Fig. 2. This arrangement has the advantage that the slide 14 may be exceptionally strong, so that the wear that would necessarily occur in the use of ordinary shears is avoided. The piston 10' and its piston rod 10 are then moved to the left so that the extension 11 of the piston rod 10 engages the cut end of the cut-off stud and moves it forwardly into the nozzle 12 and at the same time holds the slide 14 against the action of spring means 21 provided for the return movement of the slide 14.

The members 5 and 7, both movable within the device 3, are now simultaneously operated but independently of each other, and both move towards the left, and at this time the holding device 4 is disengaged from the wire $p$ while the gripping device 6 is closed so that it grips the wire and draws it towards the left so that the wire material $p$ is advanced with respect to the device 3 through the straightening means 2, and this advanced position is shown in Fig. 2.

After being cut, the stud is thus pressed against the work-piece $a$ with a pressure which is determined by the compression of the spring 8. During the butt welding of the stud, the sliding member 9 is held in its advanced position by the spring 8, the advance movement of the member 9 corresponding to the length of the stud.

After the completion of each welding operation, the piston 10' is returned to its initial position so that the extension 11 is withdrawn from the slide 14, which latter is thus released and is raised by the spring means 21 and is thus brought to such a level that the bore 17 in the slide 14 will be in exact alignment with the wire material p. The members 5 and 7 are then moved to the right into the position shown at Fig. 1, and during this movement the gripping device 6 is open and the holding device 4 is closed. As the sliding member thus moves to the right, the free end of the wire p is received by the bore 17 in the slide 14 so that the desired length of wire for the next stud is determined by the width of the slide 14 and the end of the wire is engaged by the abutment 18. The slide 14 with the end of the wire p in its bore 17 is then in position for its next downward shearing motion.

While one embodiment of the invention has been described herein, it is to be understood that it is not intended as a limitation except within the scope of the claims hereto or hereinafter appended.

We claim:

1. A method of producing and delivering to butt welding position upon the surface of a work-piece, studs or wire lengths successively cut from a continuous wire, which comprises the successive steps of straightening and advancing the wire endwise in a straight line, cutting a length from the leading end of the wire and simultaneously displacing it in a transverse direction, advancing both the cut-off length and the continuous strip at the same time in parallel relation to each other until the cut-off length is in aligned position for welding to the work-piece and the end of the wire is in the advanced position for the production of the next successive length.

2. A method of delivering for butt welding to the surface of a work-piece, studs or wire lengths successively cut from a continuous strip or wire, which comprises advancing and straightening the wire, successively cutting lengths of wire from the leading end of the wire, successively moving each cut-off length transversely into a position spaced from but parallel to the line of advancement of the wire, and moving each cut-off length successively in an endwise direction into contact with the work-piece for butt welding, each such advance movement of a cut-off length being simultaneous with a corresponding movement of the wire into its advanced position.

3. An apparatus for delivering, for butt welding to the surface of a work-piece, studs or wire lengths successively cut from a continuous strip or wire, which comprises means for advancing the wire in a straight line, means for straightening the advancing wire, a slide for receiving the leading portion of the wire fed by said advancing means, means for moving said slide at right angles to said wire to shear the leading portion therefrom to form a stud, a nozzle for receiving the stud, and means for moving the stud longitudinally through said nozzle into engagement with the work-piece in readiness for welding.

4. An apparatus for delivering, for butt welding to the surface of a work-piece, studs or wire lengths successively cut from a continuous strip or wire, which comprises piston means for feeding the wire in a straight line, means for straightening the moving wire, a slide for receiving the leading portion of the wire, means for moving said slide at right angles to said wire to shear the leading portion therefrom, means for advancing the slide towards the work-piece, and means for moving the stud longitudinally through said slide into engagement with the work-piece in readiness for welding.

5. An apparatus for delivering, for butt welding to the surface of a work-piece, studs or wire lengths successively cut from a continuous strip or wire, which comprises means for straightening the wire and for advancing it longitudinally, a slide formed with a bore for receiving the leading portion of the wire, means for moving the slide transversely of the wire to cut the stud from the end of the wire, and means movable in a line parallel to the wire for penetrating said slide and for moving the stud into position for welding, and means for advancing the slide in a longitudinal direction.

6. An apparatus for delivering, for butt welding to the surface of a work-piece, studs or wire lengths successively cut from a continuous strip or wire, which comprises means for straightening the wire and for advancing it longitudinally, a slide for receiving the leading portion of the wire, means for moving the slide transversely of the wire to cut the stud from the end of the wire, means movable in a line parallel to the wire for penetrating said slide and for moving the stud into position for welding, means for advancing the slide in a longitudinal direction, means for simultaneously advancing the wire in parallel relation to the stud, and means for returning the slide transversely to receive the advanced end of the wire for the cutting of the next successive stud.

7. A method of producing and delivering to butt welding position upon the surface of a work-piece, studs or wire lengths successively cut from a continuous strip or wire, which method comprises the steps of advancing the wire in a straight line to insert the leading end thereof into the bore of a cutting slide of the weld head, cutting off a predetermined length of the wire by the movement of the slide and moving the severed length within the slide into a line parallel to but spaced from the line of advance of the wire and into line with a nozzle upon the weld head, advancing the weld head towards the work-piece, pushing the severed length into said nozzle and at the same time advancing the wire a length equal to the severed length, moving the cutting slide into its initial position after butt-welding of the severed length to the work-piece, and retracting the weld head and receiving the end of the wire into the bore of the cutting slide.

References Cited in the file of this patent

UNITED STATES PATENTS

| | | |
|---|---|---|
| 1,344,961 | Remmington | June 29, 1920 |
| 1,417,806 | Lapotterie | May 30, 1922 |

FOREIGN PATENTS

| | | |
|---|---|---|
| 405,657 | Germany | Nov. 6, 1924 |